United States Patent

[11] 3,529,528

[72] Inventor Ludwig Leitz
 Wetzlar, Germany
[21] Appl. No. 687,650
[22] Filed Dec. 4, 1967
[45] Patented Sept. 22, 1970
[73] Assignee Ernst Leitz GmbH,
 Wetzlar, Germany
[32] Priority Dec. 6, 1966
[33] Germany
[31] L 55,208

[54] PHOTOELECTRIC PRECISION CAMERA RANGE FINDER WITH OPTICAL VERIFICATION
6 Claims, 4 Drawing Figs.
[52] U.S. Cl. .................................................. 95/44,
 350/46, 355/55, 356/4
[51] Int. Cl. .................................................. G03b 3/00
[50] Field of Search.......................................... 95/44, 44C,
 45; 355/55, 61; 350/46, 76, 77; 353/101; 356/4

[56] References Cited
UNITED STATES PATENTS

| | | | |
|---|---|---|---|
| 1,847,010 | 2/1932 | Koppe | 355/61 |
| 2,968,994 | 1/1961 | Shurcliff | 350/46 |
| 2,983,208 | 5/1961 | Sapp | 95/44 |
| 3,185,059 | 5/1965 | Durst | 95/44 |
| 3,270,647 | 9/1966 | Jakob et al. | 95/44 |
| 3,274,914 | 9/1966 | Biedermann et al. | 95/44 |

Primary Examiner—John M. Horan
Assistant Examiner—Richard L. Moses
Attorneys—Krafft and Wells ABSTRACT: A range finder device for cameras comprising an optical range finder for coarse visual control of the camera range setting as well as a photoelectric range finder for a precise reading of the range setting, the optimal setting being indicated when both readings simultaneously indicate their optimal value. The optical range finder is either of the triangulation type, split image type, or of the ground glass type, while the photoelectric range finder uses two photo-resistors in a differential balance type circuit supplied by an AC-current. The arrangement is suitable for adaptation to "range finder" cameras as well as to single lens reflex cameras.

INVENTOR
Ludwig Leitz
BY
Krafft & Wells
ATTORNEYS

INVENTOR
Ludwig Leitz
BY
Krafft & Wells
ATTORNEYS

PHOTOELECTRIC PRECISION CAMERA RANGE FINDER WITH OPTICAL VERIFICATION

CROSS-REFERENCE TO RELATED APPLICATIONS

Reference is made to applicant's co-pending application Ser. No. 686,569, filed Nov. 29, 1967, now U.S. Pat. No. 3,529,527.

BACKGROUND OF THE INVENTION

1. Field of the Invention

The present invention relates to range finding devices in photographic cameras, and more particularly to photoelectric range finding devices.

2. Description of the Prior Art

It is well known to those skilled in this particular art to guide the two light beams of, for example, a coincidence-type range finder to two photoelectric receivers. These receivers consist each of an arrangement of elongated photosensitive elements on which the light beams are simultaneously incident. An electric circuitry is provided for comparing the voltage difference of the signals generated in the elements by said two light beams, which means comprise a measuring instrument having an indicating needle. Range finding is accomplished by adjusting the optical elements of the range finder until the deflection of the needle of the measuring instrument is a minimum.

However, it was found that minimum needle deflection may result, even though the range finder has not yet been adjusted to the correct distance. Such erroneous adjustments occur primarily when the objects whose distance is measured are surrounded by an object space of periodic structure containing a plurality of similar objects located side-by-side, such as, for example, a row of trees or of uniformed persons. From such periodic structure equal light fluxes can originate which may not come from the object itself but from other object space portions, from which by sheer coincidence a light flux may emerge which equals in intensity the light flux impinging on the photoelectric receivers from the object. This, however, may not be noticed by the operator.

It is therefore an object of the present invention to provide a range finder device where the degree of adjustment is indicated as a photoelectric precision reading as well as in an optical range finding image, so as to avoid erroneous adjustments.

This object is attained by combining in a photographic camera a photoelectric precision range finder and an optical range finder. The latter then serves as a coarse adjustment indicator, while the photoelectric reading is used only for the fine adjustment reading within a range where the above-described problems of spatial periodicity is no longer present. During the initial adjustment, the object itself is observed through a split-image-type, or coincidence-type, or ground-glass-type optical range finder. The subsequent "corrective" fine adjustment is made while observing the reading of the photoelectric range finder, which may be shown by a moving instrument needle. The basic idea of the new device is to permit a coarse lens setting sufficiently close to the correct position by means of the optical range finder so that the axes of the two range finder beams are already generally directed to the object to be measured, consequently eliminating the danger of one of the photoelectric receivers being exposed to light rays of object intensity, which actually do not result from the object.

DESCRIPTION OF THE DRAWINGS

The invention will be more fully comprehended from the following description when taken in conjunction with the accompanying drawings wherein.

DESCRIPTION OF THE PREFERRED EMBODIMENTS

Figure 1:
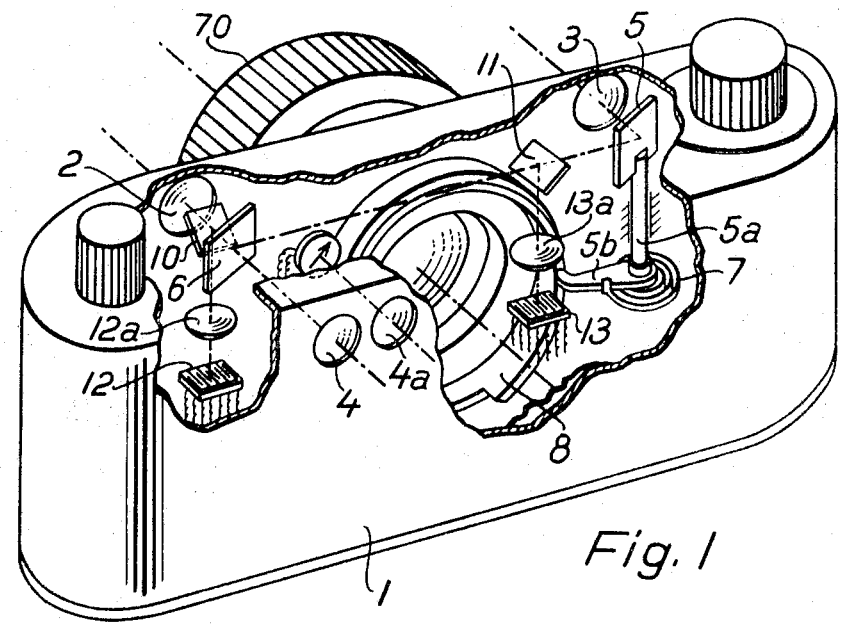
FIG. 1 is a perspective sectional view of a range finder camera in which an optical and a photoelectric range finding device are incorporated.

Referring now to FIG. 1 the camera 1 is provided with an optical range finder of known design. This range finder comprises two objective lenses 2 and 3 and one ocular 4. Objective lens 2 and ocular 4 form at the same time the view finder of the camera.

In the path of the view finder light beam between objective lens 2 and ocular 4 there is disposed a semi-transparent mirror 6 at an angle of 45° to the optical axis. By said mirror the second range finder light beam impinging from objective lens 3 via a mirror 5 is reflected into the ocular 4. Mirror 5 is mounted on a pivotable shaft 5a which is in rigid connection with a lever 5b. A spring 7 exerts a force on lever 5b thereby keeping the free end portion of lever 5b in operative connection with a cam 8. The latter is part of the camera objective lens 70 and is rotatable with said lens for distance adjustment purposes.

The above described elements by themselves constitute a known optical range finder of the split-image type or coincidence-type.

Figure 2:
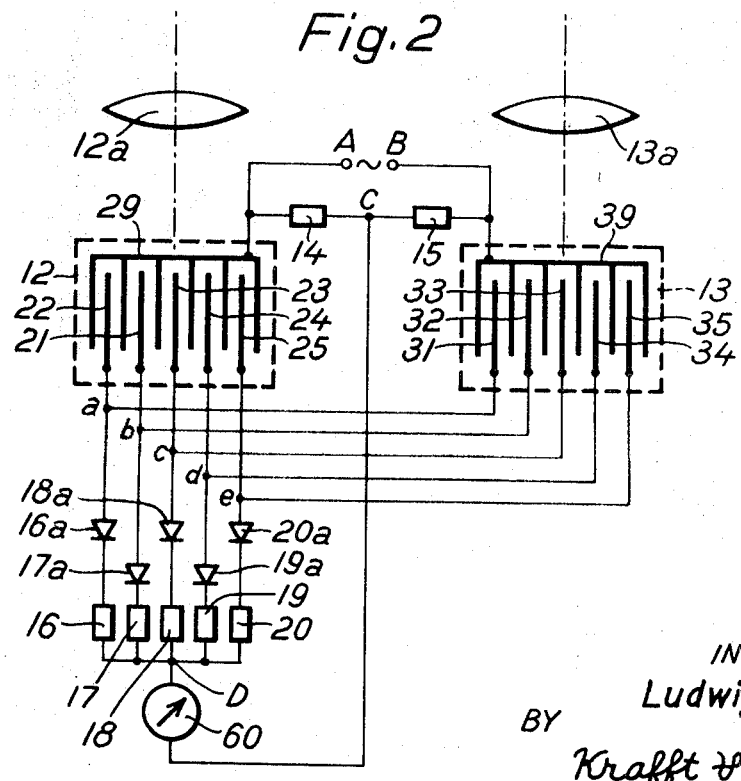
FIG. 2 shows schematically a wiring diagram of the photoelectric range finder.

The camera 1 is further provided with two semi-transparent mirrors 10, 11 which are arranged, one in the path of each range finder light beam. By said mirrors 10, 11 a portion of each beam is reflected to separate photoelectric resistors 12, 13 through field lenses 12a, 13a. The photoelectric resistors are elements in a Wheatstone bridge circuit, as shown in FIG. 2, which further comprises the ohmic resistors 14, 15, further ohmic resistors 16, 17, 18, 19, 20 and current rectifiers 16a, 17a, 18a, 19a, 20a.

The photoelectric resistors are of identical design, shape and electrical properties. Each one consists of signal electrodes 21, 22, 23, 24, 25 and 31, 32, 33, 34, 35 respectively which are electrically separated from each other and are arranged in parallel. One common electrode 29 and 39 respectively is provided in each photoelectric resistor. The signal electrodes 21 through 25 and 31 through 35 are connected in pairs and each pair is connected to a series arrangement of one current rectifier 16a through 20a and one ohmic resistor, the ohmic resistors being connected in parallel to terminal D in the circuit.

The Wheatstone bridge is supplied with an AC current at the terminals A, B and the measuring instrument 60 is connected between the terminals D and C. The field lenses 12a, 13a are arranged in front of the photoelectric resistors.

The above described elements constitute a photoelectric range finder which functions in the following manner: If, on the photoelectric resistor 12, light beams are incident from the details of a certain object to be measured, the different photosensitive elements between the signal electrodes 21 through 25 will assume different resistance values according to the intensities of said light beams originating from said object details. Equal resistance values will be assumed by the photosensitive elements of resistor 13 if the pivotable mirror 5 in front of the resistor 13 is adjusted to a position wherein it reflects on the resistor 13 light beams emitting from the same object details as the light beams which are incident on the resistor 12. Under this condition of adjustment the bridge is balanced. At the terminals "a" through "e" half of the supply voltage can be measured. If, however, the object details imaged on both photoelectric resistors 12, 13 do not coincide, the voltage of at least one of the terminals "a" through "e" will be different from the half supply voltage. The current flowing through this terminal causes the needle of the measuring instrument 60 to be deflected. As is well known to those skilled in the art, range finding with photoelectric range finders is accomplished by directing the one of the photoelectric resistors in front of which the optical elements are rigidly arranged to the object to be measured. Then the pivotable optical elements in front of the second photoelectric resistor are pivoted until the needle deflection in the measuring instrument is a minimum. The position of the pivotable optical elements can be read against a scale which may be calibrated in distance units, e.g. in feet or meters.

The novel range finding device according to the invention is operated in two steps, by first adjusting the camera objective lens 70 by manually rotating said lens while viewing the image of the optical coincidence-type or split image-type range finder through ocular 4. After the objective lens 70 has thus been set coarsely to the object distance, the second step, which is the corrective fine adjustment of the objective lens to the object distance, is performed also by manually rotating lens 70, however, this time while observing the deflection of the needle of instrument 60, for example, through an auxiliary ocular 4a.

Emphasis is put on the fact that the novel range finding device is by no means limited to those cameras which in the art usually are termed "range finder" cameras. The new device can equally advantageously be employed with so-called single lens reflex cameras, if said cameras are additionally provided with a photoelectric range finding device as described above.

Figure 3:
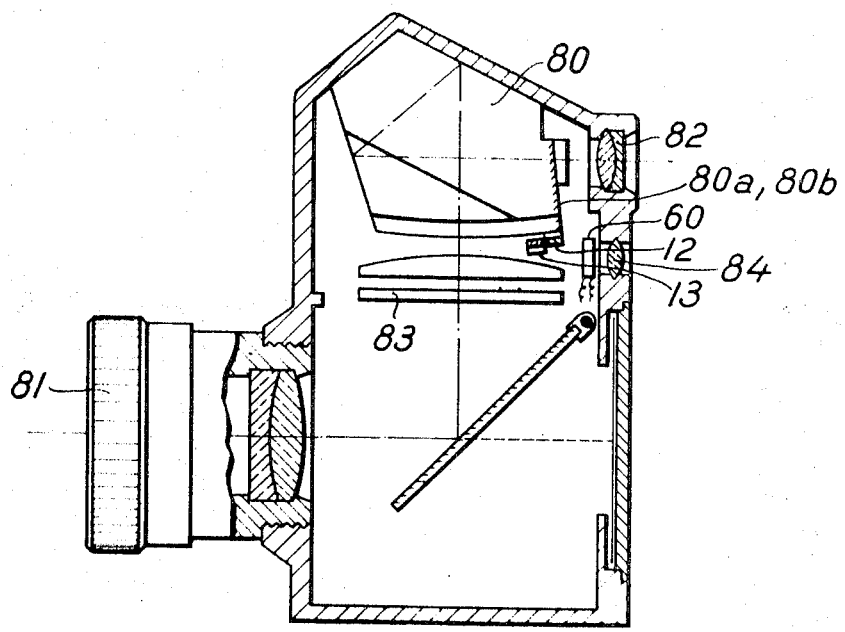
FIG. 3 is a sectional view of a single lens reflex camera with a photoelectric range finder, showing a different embodiment of the invention.
Figure 3A:
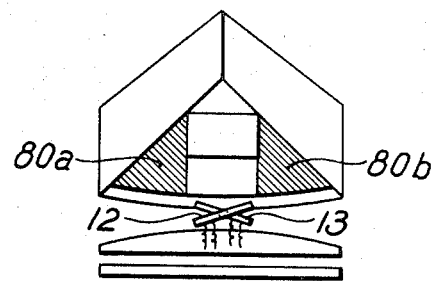
FIG. 3a is a partial rear view of the penta prism and the photoelectric receivers of the embodiment of FIG. 3.

Particularly satisfactory results are obtained if the photoelectric resistors 12 and 13 are disposed in the place where in applicant's co-pending application Ser. No. 686,569, filed Nov. 29, 1967, the deviating wedges are located. FIGS. 3 and 3a show the resistors 12 and 13 arranged to the rear side of the camera and beneath the entering surface of penta prism 80. In this place the resistors are particularly adapted to be illuminated by light beams from large aperture image portions of the objective lens 81, after reflection of said beams from the silvered and inclined rear surface portions 80a and 80b of the penta prism 80. The photoelectric range finder incorporated in the single lens reflex camera makes thus use of a considerably enlarged base line in substantially the same manner as the optical coincidence-type or split image-type range finder which is disclosed in my above-mentioned co-pending application.

Below the main ocular 82 the camera has a second ocular 84 through which the photoelectric indicator 60 can be observed. The electric circuitry is the same for both embodiments shown.

Range finding with a single lens camera as illustrated in and described with reference to the FIGS. 3 and 3a is accomplished in much the same way as is done with range finder cameras. It involves an initial coarse adjustment of the lens 81 to the object distance while viewing an intermediate image of the object through the ocular 82 on the viewing screen or ground glass 83, followed by a "corrective" fine adjustment by observing the needle deflection in the instrument 60 through ocular 84.

Instead of being provided with the resistors 12, 13 the reflex camera may of course have a conventional central split image range finder comprising two deviating wedges in the central ground glass or viewing screen portion. The two bundles of light emerging from the wedges may be divided into two portions each, with one portion of each bundle being reflected to the ocular and the other portions being conducted to the photoelectric receivers. The light rays emerging from the deviating wedges are thus used both for coarse and for fine adjustment.

I claim:

1. In combination with a photographic camera having a housing, a range finder device comprising:
   optical range finder means mounted in said camera and responsive to first and second light fluxes originating from object areas having an indication of the camera range setting;
   photoelectric range finder means mounted in said camera including a first light flux sensing element located in the path of said first light flux and a second light flux sensing element located in the path of said second light flux, said two light flux sensing elements connected to indicator means responsive to differential changes between the two light fluxes, thereby discriminating between the condition when the light fluxes originate from unequal object areas and the condition when the light fluxes received are identical in that they originate from a common object area or from separate light flux equivalent object areas; and
   means in said housing for simultaneous viewing of said indication of the camera range setting and said indicator means whereby further discrimination is obtained between the condition when the identical light fluxes originate from a common object area and the condition when they originate from separate, light flux equivalent object areas whereby the optical range finder means gives a coarse visual control of the camera range setting and the photoelectric range finder means gives the precise reading of the camera range setting.

2. The device as defined in claim 1, wherein the photoelectric range finder means further includes a power source supplying alternating current to its circuitry which is of the differential-balance-type, two identical photo-resistors in this circuitry serving as the light-flux-sensing elements, and optical means directing the light flux originating from at least a portion of the object area to said resistors, whereby the portion of the object area received by at least one of the resistors shifts in response to changes in the camera range setting.

3. The device as defined in claim 2, wherein the optical range finder means are of the triangulation-type and include two spaced image receiving means for viewing of at least a portion of the object area through each of said means, and mirror means to combine the two images thus received into a coincidence-type comparison image, the mirror means including orientable means for the shifting of at least one of the object area portions viewed in response to changes in the camera range setting; and wherein
   the photoelectric range finder means further include optical means in the path of each of the two images received by the optical range finder means, thereby deflecting a fraction of the light flux from the two images to the two photo-resistors for simultaneous optical and photoelectric comparison of the two images received.

4. The device as claimed in claim 3, wherein one of the image-receiving means also serves as a view finder means and includes a view finder/optical range finder ocular, the coincidence-type comparison image being a part of the view finder image; and wherein
   the photoelectric range finder means further includes as indicator means a movable needle, and further includes a second ocular located adjacent to the view finder ocular for visual reading of the needle position.

5. The device as defined in claim 2, wherein the optical range finder means include, in combination with a single lens reflex camera, a movable mirror, a horizontal imaging screen for the reception of an intermediate image, a field lens above the screen, a pentaprism thereabove, and an ocular serving both as a view finder ocular and optical range finder ocular; and wherein
   the photoelectric range finder means include mirror means located on the back side of the pentaprism ahead of the ocular and laterally outside the image field; the two photo-resistors being located between the field lens and the pentaprism outside the image field and arranged side-by-side in the form of parallel, elongated parts tilted in opposite directions around a common transverse surface line, wherein the last-mentioned mirror means reflect a portion of the intermediate image from the screen onto the photo-resistors, which latter register identical light fluxes when the intermediate image is in focus and different light fluxes when it is out of focus.

6. The device as defined in claim 5, wherein the optical range finder means are of the ground-glass-type, the intermediate image created on the imaging screen being visible in the view finder/optical range finder ocular; and wherein the photoelectric range finder means further includes as indicator means a movable needle, and further includes an ocular located adjacent to the view finder ocular for visual reading of the needle position.